US008366323B2

(12) United States Patent
Waki et al.

(10) Patent No.: US 8,366,323 B2
(45) Date of Patent: Feb. 5, 2013

(54) ROTATION SHAFT SUPPORTING STRUCTURE WITH JOURNAL BEARING AND ASSEMBLING METHOD OF THE BEARING

(75) Inventors: Yuichiro Waki, Tokyo (JP); Takashi Nakano, Tokyo (JP); Takaaki Kaikogi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 487 days.

(21) Appl. No.: 12/617,180

(22) Filed: Nov. 12, 2009

(65) Prior Publication Data

US 2010/0177999 A1    Jul. 15, 2010

(30) Foreign Application Priority Data

Nov. 12, 2008    (JP) .................................. 2008-289587
Nov. 12, 2008    (JP) .................................. 2008-289588

(51) Int. Cl.
*F16C 17/00*    (2006.01)
*F16C 32/06*    (2006.01)
(52) U.S. Cl. ........................................ 384/312; 384/117
(58) Field of Classification Search .................. 384/117, 384/119, 122, 124, 215, 224, 306–312, 322, 384/369, 428
See application file for complete search history.

(56) References Cited

U.S. PATENT DOCUMENTS

| | | | | |
|---|---|---|---|---|
| 2,480,114 A | * | 8/1949 | Bradbury | ..................... 384/306 |
| 2,743,142 A | * | 4/1956 | Balsiger | ..................... 384/312 |
| 3,985,405 A | * | 10/1976 | Okano et al. | ................... 384/117 |
| 4,597,676 A | * | 7/1986 | Vohr et al. | ...................... 384/114 |
| 5,518,321 A | * | 5/1996 | Hata | .............................. 384/311 |
| 5,738,447 A | * | 4/1998 | Nicholas | ........................ 384/117 |
| 5,743,657 A |   | 4/1998 | O'Reilly et al. | |
| 6,361,215 B1 | * | 3/2002 | Wilkes et al. | ................. 384/117 |

(Continued)

FOREIGN PATENT DOCUMENTS

| | | |
|---|---|---|
| JP | 58-37312 | 3/1983 |
| JP | 58-125718 | 8/1983 |

(Continued)

OTHER PUBLICATIONS

Japanese Office Action issued Mar. 7, 2011 in corresponding Japanese Patent Application No. 2008-289588 w/English translation.

(Continued)

*Primary Examiner* — James Pilkington
(74) *Attorney, Agent, or Firm* — Wenderoth, Lind & Ponack, L.L.P.

(57) ABSTRACT

A rotation shaft supporting structure has radial clearance between a bearing surface of an upper tilting pad and a rotating surface of the journal that can be adjusted so that a high pressure oil film is formed in the clearance and carryover of lubrication oil from an upstream pad to its adjacent downstream pad is prevented. Oil supply nozzles are mounted to the bearing housing to be located adjacent to the upstream and downstream side end of each bearing pad. An upstream side nozzle supplies lubrication oil to the bearing surface of the pad and a downstream side nozzle injects oil toward the journal surface to prevent carryover of lubrication oil from the bearing surface of the upstream pad to that of the downstream pad dragged by the rotating surface of the journal. The nozzles also serve as stoppers to prevent rotational movement of the pad.

20 Claims, 9 Drawing Sheets

U.S. PATENT DOCUMENTS

| | | | |
|---|---|---|---|
| 7,611,286 B2 * | 11/2009 | Swann et al. | 384/312 |
| 8,083,413 B2 * | 12/2011 | Ertas | 384/117 |
| 2008/0013872 A1 * | 1/2008 | Geiger | 384/309 |

FOREIGN PATENT DOCUMENTS

| | | |
|---|---|---|
| JP | 64-11423 | 1/1989 |
| JP | 5-332355 | 12/1993 |
| JP | 9-133127 | 5/1997 |
| JP | 10-503827 | 4/1998 |
| JP | 2000-274432 | 10/2000 |
| JP | 2003-176818 | 6/2003 |
| JP | 2004-100729 | 4/2004 |
| JP | 2006-112499 | 4/2006 |
| JP | 2007-255614 | 10/2007 |

OTHER PUBLICATIONS

International Preliminary Report on Patentability and Written Opinion of the International Searching Authority dated Jun. 21, 2011 issued in corresponding International Application No. PCT/JP2009/069192.

* cited by examiner

C - C section

B - B section

View in direction of arrow A

D - D section

Z: Mechanical loss which is the sum of frictional loss due to side seals, and agitation loss between pads Y: Frictional loss due to upper pads X: Frictional loss due to lower pads

ROTATION SHAFT SUPPORTING STRUCTURE WITH JOURNAL BEARING AND ASSEMBLING METHOD OF THE BEARING

TECHNICAL FIELD

The present invention relates to a rotation shaft supporting structure of a direct lubrication type tilting pad journal bearing for example in a large rotating machine such as a steam turbine, gas turbine, and electric generator, specifically to a rotation shaft supporting structure with which formation of high pressure oil film on the bearing surface of the upper bearing pad is made possible.

BACKGROUND ART

A self-aligning journal bearing having tiling pads has been used as a journal bearing of a large size rotating machine.

A journal bearing having tilting pads devised by the applicant of this application is disclosed in patent literature 1 (Japanese Laid-Open Patent Application No. 5-332355). As disclosed in the patent literature 1, each of the tilting pads is supported by means of a spherical pivot and an adjusting liner received in a recess defined in the back side face of the tilting pad and in a recess defined in the inner side face of the bearing housing such that the pad is swingable about an axis parallel with the rotation shaft (circumferentially swingable) and about a direction perpendicular to the axial direction of the rotation shaft (axially swingable).

As the pads are swingable circumferentially and axially in accordance with the movement of the journal, a journal bearing of tilting pad type has self-aligning function.

Therefore, it can support a journal stably and is preferably adopted for high speed rotating machines.

The spherical pivot is received in both the recess in the tilting pad and the recess in the bearing housing so that it serves as a stopper of the tilting pad, i.e. the tilting pad is prevented from being dragged circumferentially by the rotation of the journal.

There are two types of tilting pad journal bearing, i.e., oil flooded lubrication type and direct lubrication type. In the oil flooded lubrication type, both axial end sides of the tilting pad are sealed so that spaces between a tilting pad and the adjacent tilting pad are flooded with lubrication oil. With this type, mechanical efficiency decreases due to friction loss of the side seals and agitation loss of oil in the spaces between the tilting pads.

Occurrence of decrease of mechanical efficiency will be explained referring to FIG. 8 quoted from the patent literature 1. FIG. 8 is a graph showing a relation between mechanical loss and rotation speed of journal in a journal bearing of oil flooded type. In the graph, the total mechanical loss increases nearly proportional to the square of the rotation speed. It consists of frictional loss X between the journal surface and bearing surfaces of the lower pads on which bearing load exerts, frictional loss Y between the outer circumference of the journal and bearing surfaces of the upper pads on which bearing load does not exerts, and mechanical loss Z which is the sum of the friction loss due to the side seals and agitation loss of oil in the spaces between the pads due to agitation by the rotation of the journal.

Direct lubrication type of tilting pad radial bearing was proposed to eliminate the mechanical loss Z. In the direct lubrication type, oil supply nozzles are provided at the upstream side of each tilting pad upstream in relation to journal rotation direction and lubrication oil is supplied to the bearing surface of each tilting pad, and side seals are eliminated. Direct lubrication type is now widely adopted, as mechanical loss Z can be eliminated. The tilting pad journal bearing of the patent literature 1 is of direct lubrication type.

Another type of direct lubrication type tilting pad radial bearing is proposed in patent literature 2 (Japanese Laid-Open Patent Application No. 2000-274432). In a tilting pad journal bearing of direct lubrication type, there is a problem of so-called carryover of lubrication oil as recited in paragraph [0009] of the patent literature 2. This is a phenomenon that the lubrication oil lubricated the bearing surface of an upstream tilting pad is carried on the rotating journal to be introduced to the bearing surface of the adjacent downstream tilting pad.

Lubrication oil rises in temperature in the interstice defined by the circumferential surface of the journal and bearing surfaces of the tilting pad (hereunder referred to as bearing clearance of the tilting pad) due to shearing force in the lubrication oil in the interstice caused by the rotation of the journal. Lubrication oil increased in temperature in the bearing clearance of the upstream tilting pad is carried over to the bearing clearance of the adjacent downstream tilting pad, so the lubrication oil is further increased in temperature in the bearing clearance of the downstream tilting pad, which may cause overheat of the bearing surface of the tilting pad and occurrence of bearing seizure.

Means of preventing carryover of lubrication oil in a direct lubricating type tilting pad journal bearing are proposed in the patent literature 2.

In patent literature 3 (Japanese Laid-Open Patent Application No. 2006-112499) is proposed another means of preventing excessive temperature rise of lubrication oil in a direct lubricating type tilting pad journal bearing. With this means, an oil supply nozzle is provided to the bearing housing at each of the upstream side end and downstream side end of a tilting pad in relation to the rotation direction of the journal, and a cooling path is formed in the pad circumferentially parallel with the bearing surface of the pad. A part of oil injected from the oil supply nozzle located at the downstream side end is directed to be introduced into the cooling path, thereby cooling the bearing surface of the tilting pad from under the bearing surface thereof to suppress temperature rise of the bearing surface.

As recited in paragraph [0004] of the patent literature 2, a bearing clearance of a tilting pad (clearance between the journal surface and bearing surface of the tilting pad) is filled with lubrication oil, the pad is supported by the stationary bearing housing, and the journal rotates at high speed in the oil filled in the clearance. Therefore, very large speed difference is developed in the oil between the bearing surface of the pad and journal surface. A wedge-form oil film is formed between the bearing surface of the pad and journal surface due to the speed difference, and oil pressure is generated in the oil film to support load exerted from the journal onto the bearing surface of the pad.

FIG. 9, which is a quotation of FIG. 33 of the patent literature 2, shows pressure distribution in the lubrication oil film between the journal surface and bearing surface. In the drawing, a plurality of tilting pads 101a~d are disposed around the journal 100 to support the journal 100. Radial clearances 102 between the journal 100 and the tilting pads 101a~d are filled with lubrication oil. Integration of oil film pressures $F_p$ exerting to the bearing faces of the pads 102 coincides with the bearing load W.

High oil film pressure is generated by the effect of wedge shape of the oil film narrowing the radial clearances 102 downstream of rotation direction of the journal due to tilting the each tilting pads 101a~d.

A direct lubrication type tilting pad journal bearing is superior to an oil flooded type tilting pad journal bearing in a point that mechanical loss is smaller in the former than in the latter, as mentioned above.

However, construction becomes complicated in a direct lubrication type tilting pad journal bearing because of providing oil supply nozzles and/or adopting means to suppress carryover of lubrication oil, resulting in increased manufacturing cost.

In a tilting pad journal bearing, not only the direct lubrication type tilting pad journal bearing, tilting pads are supported swingable circumferentially and axially in relation to the journal by spherical pivots provided in the inner face of the bearing housing and the swingable supporting structure makes assembling and disassembling of the journal bearing too much like hard work. With the present structure of the journal bearing, tilting pads can be detached from inside the bearing housing only after detaching the journal bearing because the spherical pivots protrude from the bearing housing into recesses in the back face of the tilting pads.

As self weight of the rotation shaft exerts on the bearing surface of a lower tilting pad disposed on the inner face of the lower bearing housing, high pressure oil film is formed relatively easily on the bearing surface of the lower pad as the journal rotates. However, self weight of the rotating shaft does not exert on the bearing surface of an upper tilting pad disposed on the inner face of the upper bearing housing, so high pressure oil film can not be formed easily.

Further, when adjusting radial clearance between the bearing surface of a tilting pad and rotating surface of the journal so that a radial clearance narrowing toward downstream of rotation direction of the journal is formed between the bearing surface of a lower tilting pad and rotating surface of the journal in order to allow high pressure oil film on the bearing surface thereof as the journal rotates, the adjusting is not easy in the case of journal bearing of large rotating machines, for self weight of the tilting pad increases.

Patent literature 1: Japanese laid-open Patent Application No. 5-332355.
Patent literature 2: Japanese laid-open Patent Application No. 2000-274432.
Patent literature 3: Japanese laid-open Patent Application No. 2006-112499.

SUMMARY OF THE INVENTION

The present invention was made in light of problems of the background art mentioned above, and an object of the invention is to provide a rotation shaft supporting structure in a direct lubrication type tilting pad journal bearing, with which carryover of lubrication oil from the bearing surface on an upstream pad to the bearing surface of the adjacent downstream pad is prevented, simplification in construction and reduction in manufacturing cost are achieved, and assembling and disassembling of the bearing is facilitated.

Another object of the invention is to provide a rotation shaft supporting structure of the journal bearing in which the radial clearance between the bearing surface of the upper tilting pad, on which self weight of the rotating shaft does not exert, and the rotating surface of the journal can be adjusted, thereby facilitating formation of high pressure oil film on all over the bearing surfaces of the tilting pads.

To attain the object mentioned above, the present invention proposes a rotation shaft supporting structure of journal bearing having a plurality of pads disposed in a cylindrical bearing housing circumferentially spaced along the inner surface of the bearing housing so that a journal swingable placed in the cylindrical bearing housing is supported by the pads capable of being self-aligned and composed such that lubrication oil is introduced to clearances between the journal and the pads, wherein a radial clearance forming means to allow a radial clearance narrowing toward downstream of rotation direction of the journal to be formed between the bearing surface of an upper pad on which bearing load due to self-weight of the rotation shaft does not exert and the journal surface, is provided between the inner face of the upper bearing housing and the back face of the upper pad at a downstream position in relation to rotation direction of the journal.

In the invention, a radial clearance between the bearing surface of the upper pad and journal surface narrowing toward downstream of rotation direction of the journal is formed, so a high pressure oil film is formed on the bearing surface of the upper pad by the wedge effect of the oil film, as a result, favorable lubricating performance of the bearing surface is achieved and occurrence of bearing seizure can be prevented.

It is preferable radial clearance forming means is a spring member which is disposed between the inner face of the bearing housing and the back face of the upper pad to push the upper pad radially inwardly at a downstream position thereof, thereby allowing a radial clearance narrowing toward downstream of rotation direction of the journal to be formed between the bearing surface of the upper pad and journal surface.

With the construction, the upper pad is pushed downward toward the rotating surface of the journal by the elastic force of the spring member at a position on the back face of the upper pad near the down stream side end thereof in relation to the rotation direction of the journal.

It is preferable that a pad attitude adjusting means is provided near both the upstream and downstream end parts of the upper pad in relation to the rotation direction of the journal so that the radial clearance between the bearing surface of the pad and rotating surface of the journal can be adjusted by the both pad adjusting means.

A desired radial clearance narrowing downstream can be formed between the bearing surface of the upper pad and journal surface with high dimensional accuracy by the combination of the spring member and pad attitude adjusting means.

It is preferable that said pad attitude adjusting means is a bolt which penetrates a through hole drilled through the bearing housing at such a position that said bolt is screwed into a screw hole provided in the back face (outer face) of the pad near a circumferential end part of a pad disposed inside the bearing housing, whereby the radial clearance between the bearing surface of the pad and rotating surface of the journal can be adjusted by adjusting screwed-in length of the bolt into the screw hole in the back face of the pad.

With the construction, the pad attitude adjusting means is simple and inexpensive, and as the pads are held by the bearing housing by means of the bolts, the rotation shaft can be transferred with the journal bearing comprising the bearing housing and bearing pads attached to the journal of the rotating shaft.

It is preferable that each of the pads is supported at its central zone by a spherical pivot attached to the inner surface of the bearing housing so that the pad is swingable circumferentially and axially in relation to the journal, and that a radial through hole is drilled in the upper bearing housing for supporting an upper pad, on which bearing load due to self-weight of the rotation shaft does not exert, from the outer periphery thereof radially inwardly at such a position that the through hole opens facing the back face of the spherical pivot so that depth from the outer periphery of the bearing housing to the back face of the spherical pivot can be measured, whereby the radial clearance between the bearing surface of the pad and rotating surface of the journal is adjusted based on the measurement result of the depth.

It is hard to expect formation of high pressure oil film in the radial clearance between the bearing surface of the upper pad, on which the self weight of the rotation shaft does not exert, and the rotating surface of the journal. Therefore, vibration of the upper pad tends to occur. When the vibration occurs, direct contact of the rotating surface of the journal with the bearing surface of the upper pad, particularly upstream side bearing surface thereof, may occur, resulting in occurrence of cracks on the bearing surface of the upper pad.

With the construction mentioned above, the radial clearance between the bearing surface of the upper pad and rotating surface of the journal can be adjusted desirably along the bearing surface so that a high pressure oil film is formed in the clearance, so occurrence of vibration of the upper pad can be prevented.

The invention proposes a rotation shaft supporting structure of the tilting pad journal bearing of direct lubrication type in which a first oil supply nozzle is located at the upstream side end of a pad for supplying lubrication oil to the bearing surface of the pad and a second oil supply nozzle is located at the downstream side end of the pad for preventing carryover of the lubrication oil flowed out from the downstream side end of the pad to the bearing surface of a pad located downstream adjacent to the upstream pad, and the first oil supply nozzle has a casing part and is attached to the bearing housing such that a side face of the casing part contacts the upstream side end face of the tilting pad at least in line contact with the outer side periphery thereof and the second oil supply nozzle has also a casing part and is attached to the bearing housing such that a side face of the casing part contacts the downstream side end face of the tilting pad at least in line contact with the outer side periphery thereof, thereby allowing the oil supply nozzles to serve as stoppers to prevent circumferential movement of the pad.

Lubrication oil is supplied to the bearing surface of a pad from the first oil supply nozzle located adjacent the upstream side end of the pad, and from the second oil supply nozzle is injected lubrication oil toward the rotating surface of the journal to prevent carryover of lubrication oil from the upstream radial clearance to the downstream radial clearance adhering on the journal surface. The both the first and second oil supply nozzles are configured to retain the pad at both upstream and downstream side ends thereof to prevent rotational movement of the pad. In this manner, carryover of lubrication oil can be prevented, and in addition, a side of the rectangular parallelpiped casing of the oil supply nozzle attached to the bearing housing contacts each of both upstream and downstream side end faces of each pad at least in line contact along the outer edge thereof, so the pad can be prevented from rotational movement dragged by the rotating shaft by the oil supply nozzle. Therefore, separate means for preventing rotational movement of the pads is not needed, resulting in simplicity of the supporting structure.

It is preferable that each of the upstream and downstream side end faces of the pad is formed such that the side face of the casing part of the oil supply nozzle attached to the bearing housing contacts the outer side periphery of the pad in line contact and the end face of the pad departs gradually from the side face of the casing part of the oil supply nozzle as the end face of the pad runs radially inwardly.

By allowing the side face of the casing of the oil supply nozzle to contact the outer periphery of the circumferential side end face of the pad, the pad can be retained more stably.

It is suitable that each of the pads is supported at its central zone by a spherical pivot received in a recess provided in the inner face of the bearing housing so that the pad is swingable circumferentially and axially in relation to the journal, and that a radial through hole is drilled in the upper bearing housing for supporting an upper pad, on which bearing load due to self-weight of the rotation shaft does not exert, from the outer periphery thereof radially inwardly at such a position that the through hole opens facing the back face of the spherical pivot so that depth from the outer periphery of the bearing housing to the back face of the spherical pivot can be measured, whereby the radial clearance between the bearing surface of the pad and rotating surface of the journal is adjusted based on the measurement result of the depth.

It is hard to expect formation of high pressure oil film in the radial clearance between the bearing surface of the upper pad, on which the self weight of the rotation shaft does not exert, and the rotating surface of the journal. Therefore, vibration of the upper pad tends to occur. When the vibration occurs, direct contact of the rotating surface of the journal with the bearing surface of the upper pad, particularly upstream side bearing surface thereof, may occur, resulting in occurrence of cracks on the bearing surface of the upper pad.

With the construction mentioned above, the radial clearance between the bearing surface of the upper pad and rotating surface of the journal can be adjusted desirably along the bearing surface so that a high pressure oil film is formed in the clearance, so occurrence of vibration of the upper pad can be prevented.

It is preferable that each of the pads is supported at its central zone by a spherical pivot attached to the inner surface of the bearing housing so that the pad is swingable circumferentially and axially in relation to the journal, and that the spherical pivot is received in a recess provided in the inner face of the bearing housing such that the top of its spherical surface is level with the inner surface of the bearing housing, thereby enabling the pad to be inserted and extracted in the axial direction of the journal.

Pad retaining members are attached to both axial ends of the bearing housing to prevent axial movement of the pads. With the construction mentioned above, insertion and extraction of the pads can be possible by removing the pad retaining members sliding the pads axially. Therefore, replacing or repairing of the pads can be possible without removing the rotation shaft.

A method of assembling the journal bearing of the structure according to the invention composed such that each of the pads is supported at its central zone by a spherical pivot received in a recess provided in the inner face of the bearing housing so that the pad is swingable circumferentially and axially in relation to the journal, and that a radial through hole is drilled in the upper bearing housing for supporting an upper pad, on which bearing load due to self-weight of the rotation shaft does not exert, from the outer periphery thereof radially inwardly at such a position that the through hole opens facing the back face of the spherical pivot so that depth from the outer periphery of the bearing housing to the back face of the spherical pivot can be measured, the method comprises measuring the depth from the outer periphery of the bearing housing to the back face of the spherical pivot, and placing an adjusting shim on the back face of the spherical pivot to adjust the position of the top of the spherical surface of the spherical pivot in order to adjust the radial clearance between the bearing surface of the pad and rotating surface of the journal.

According to the method of the invention, adjusting of the radial clearance between the bearing surface of the upper pad, on which the self weight of the rotation shaft does not exert, and rotating surface of the journal can be performed easily, so that a desired high pressure oil film can be formed in the radial clearance.

In the method of the invention, it is preferable that the pad attitude adjusting means is provided near both the upstream and downstream end parts of the upper tilting pad in relation to the rotation direction of the journal, and the radial clearance between the bearing surface of the pad and rotating surface of the journal is so adjusted by the pad attitude adjusting means that a radial clearance narrowing downstream of rotation direction of the journal, thereby effecting generation of lubrication oil film increasing in pressure toward downstream of rotation direction of the journal.

By this, a high pressure oil film can be formed in the radial clearance between the bearing surface of the upper pad and rotating surface of the journal, in other words, on the bearing surface of the pad due to the so-called wedge effect.

As a result, lubrication property on the bearing surface of the upper pad can be improved, and occurrence of bearing seizure can be prevented.

It is preferable that said pad attitude adjusting means is a bolt which penetrates a through hole drilled through the bearing housing at such a position that said bolt is screwed into a screw hole provided in the back face (outer face) of the pad near a circumferential end part of a pad disposed inside the bearing housing, whereby the radial clearance between the bearing surface of the pad and rotating surface of the journal can be adjusted by adjusting screwed-in length of the bolt into the screw hole in the back face of the pad.

With the construction, the pad attitude adjusting means is simple and inexpensive, and as the pads are held by the bearing housing by means of the bolts, the rotation shaft can be transferred with the journal bearing comprising the bearing housing and bearing pads attached to the journal of the rotating shaft.

According to the present invention, the journal of a rotation shaft is supported by a tilting pad journal bearing in such a state that a radial clearance narrowing toward downstream of rotation direction of the journal is formed between the bearing surface of an upper bearing pad and the rotating surface of the journal, so a high pressure oil film is formed in the radial clearance, in other word, on the bearing surface of the upper pad, by the so-called wedge effect.

Therefore, favorable lubrication property can be maintained between the bearing surface of the upper pad and rotating surface of the journal, preventing occurrence of burning out of the bearing surface.

Further, according to the invention, the journal bearing is composed such that the first oil supply nozzle has a casing part and is attached to the bearing housing such that a side face of the casing part contacts the upstream side end face of the tilting pad at least in line contact with the outer side periphery thereof and the second oil supply nozzle has also a casing part and is attached to the bearing housing such that a side face of the casing part contacts the downstream side end face of the tilting pad at least in line contact with the outer side periphery thereof, thereby allowing the oil supply nozzles to serve as stoppers to prevent circumferential movement of the pad, so that the mechanical loss in lubrication is decreased, carryover of lubrication oil from an upstream pad to the adjacent downstream pad is suppressed, and separate means to prevent circumferential movement of the pad is not needed.

Furthermore, according to the invention, in the journal bearing composed such that a radial through hole is drilled in the upper bearing housing for supporting an upper pad from the outer periphery thereof radially inwardly at such a position that the through hole opens facing the back face of the spherical pivot, the radial clearance between the bearing surface of the upper pad and the journal surface is adjusted by measuring the depth from the outer periphery of the bearing housing to the back face of the spherical pivot and placing an adjusting shim on the back face of the spherical pivot based on the measurement result of the depth. Therefore, the radial clearance between the bearing surface of the upper pad and journal surface can be set to a desired dimension so that a high pressure oil film can be formed in the radial clearance, in other words, on the bearing surface of the upper pad, occurrence of vibration of the upper pad can be prevented and lubrication property of the bearing surface of the upper pad is improved, which results in elimination of occurrence of bearing seizure.

DETAILED DESCRIPTION OF THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
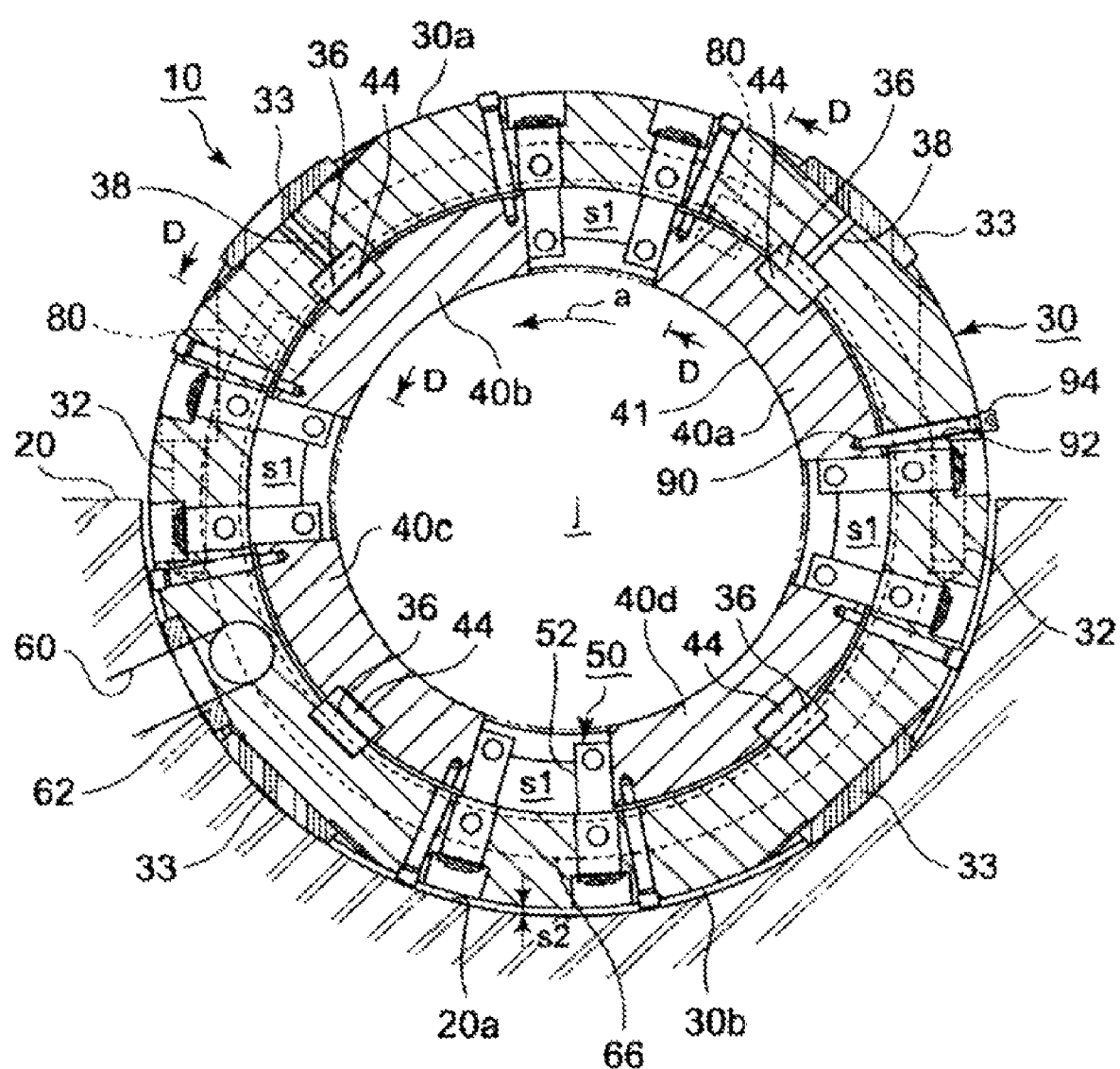
FIG. 1 is a sectional front view of embodiment of the journal bearing of the present invention (C-C section in FIG. 2).
Figure 2:
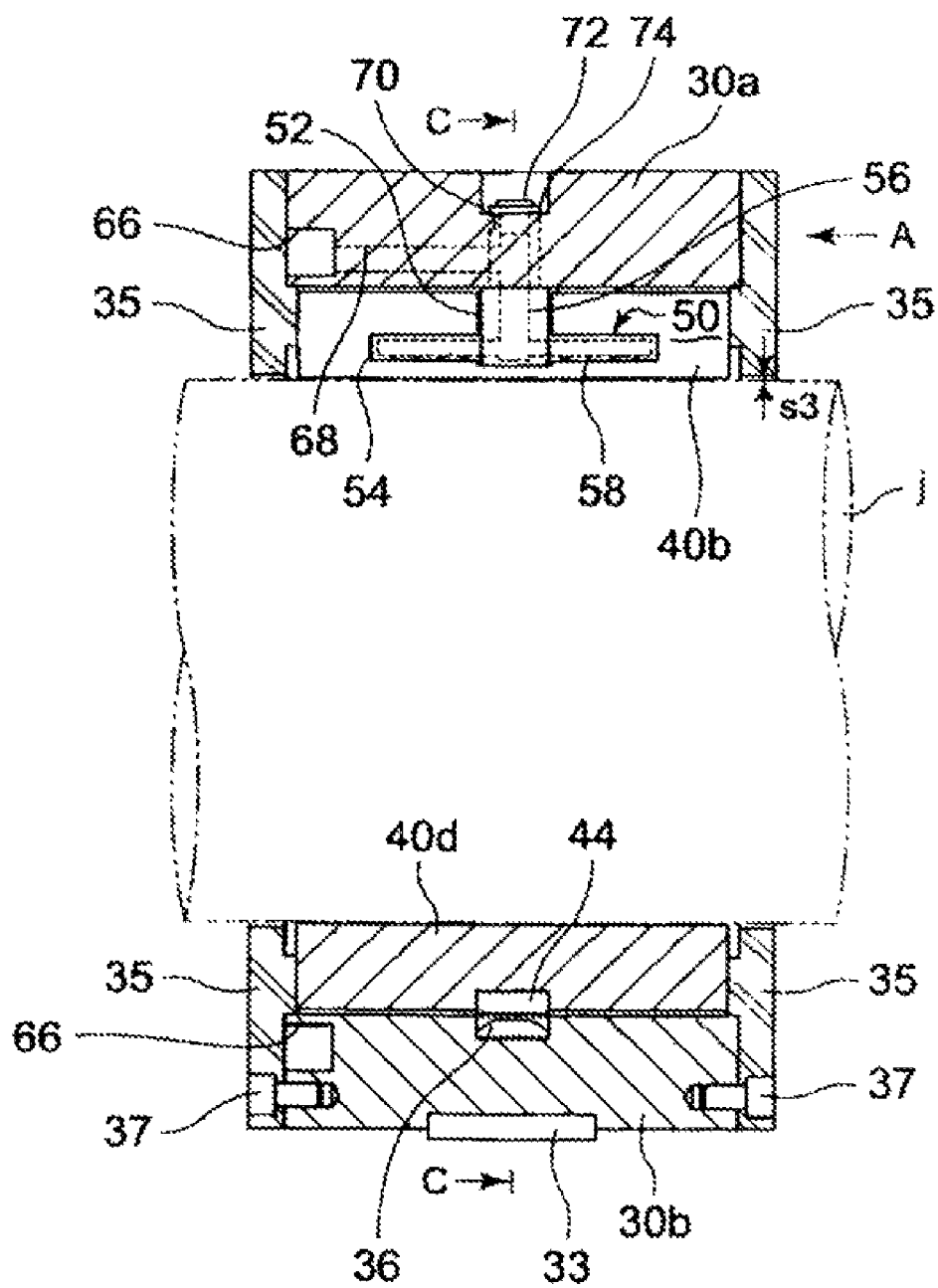
FIG. 2 is a sectional side view of the embodiment of FIG. 1(B-B section in FIG. 3).
Figure 3:
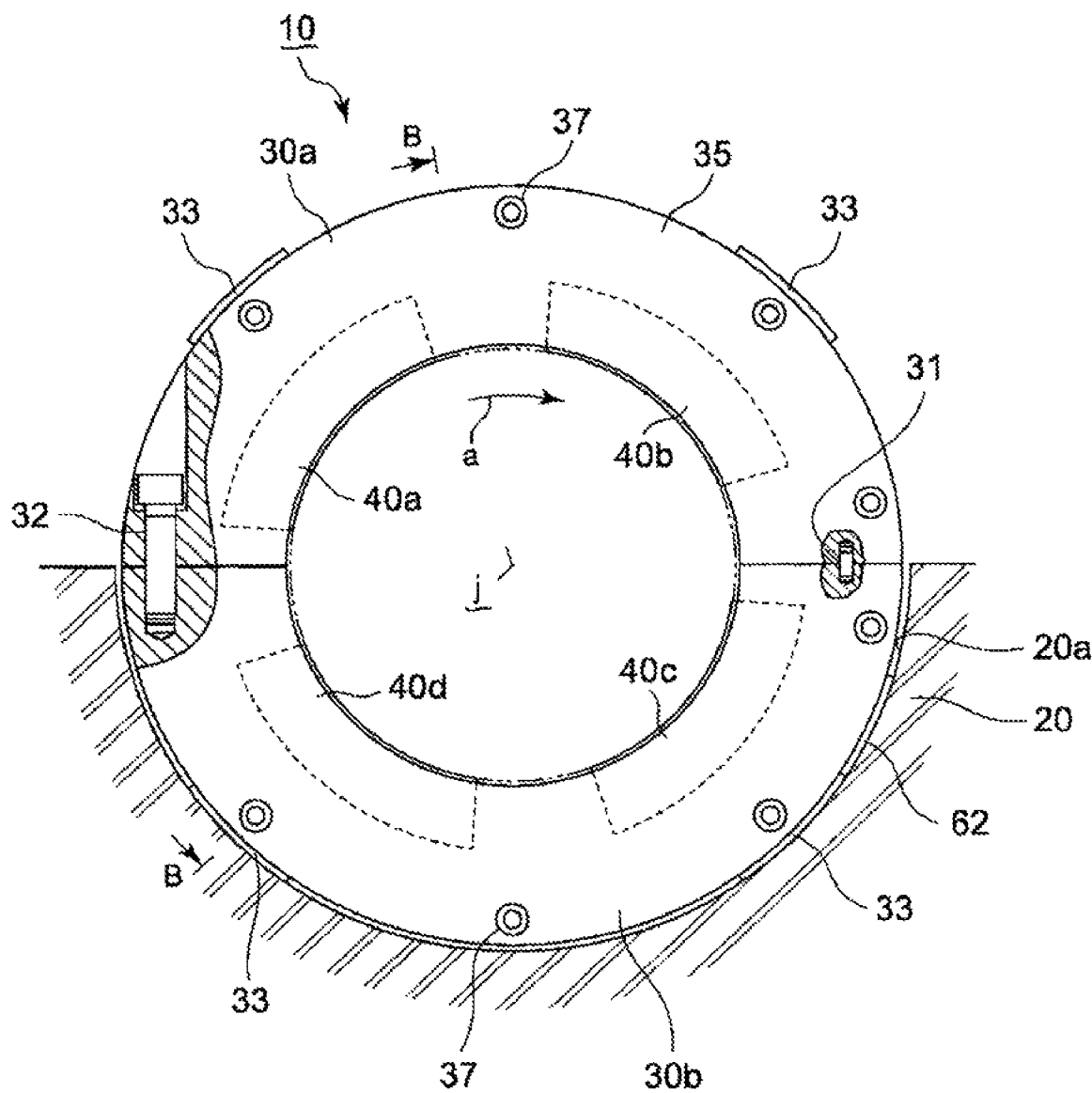
FIG. 3 is a rear view of the embodiment of FIG. 1 (view in the direction of arrow A in FIG. 2).

FIGS. 1 to 3 show an embodiment of the journal bearing of the invention, FIG. 1 is a sectional front view along line C-C in FIG. 2, FIG. 2 is a sectional side view along line B-B in FIG. 3, and FIG. 3 is a rear view viewed in the direction of arrow A in FIG. 2.

In FIG. 1, a journal j is a rotation shaft of large rotating machine such as a steam turbine, gas turbine, and an electric generator. The diameter of the journal j is as large as about 40 cm, so a journal bearing 10 to support the journal j becomes large in size, and circumferential velocity of the journal j becomes high. The journal j rotates in a direction of arrow a.

The journal bearing 10 supporting the journal j is comprised of a bearing platform 20, a bearing housing 30 comprising an upper semi-cylindrical housing 30a and a lower semi-cylindrical housing 30b fixedly supported by the bearing platform 20, and four tilting pads 40a~d attached to the inner circumferential surface of the bearing housing 30. The bearing platform 20 has a concave part 20a semicircular in section, and the bearing housing 30 is cut in two halves of the upper bearing housing 30a and lower bearing housing 30b. The lower bearing housing 30b is supported by the semicircular concave part 20a of the bearing platform 20. The upper bearing housing 30a is positioned by a positioning pin 31 (shown in FIG. 3) to the lower bearing housing 30b and connected to the lower bearing housing 30b by fastening bolts 32 as shown in FIG. 3.

Figure 4:
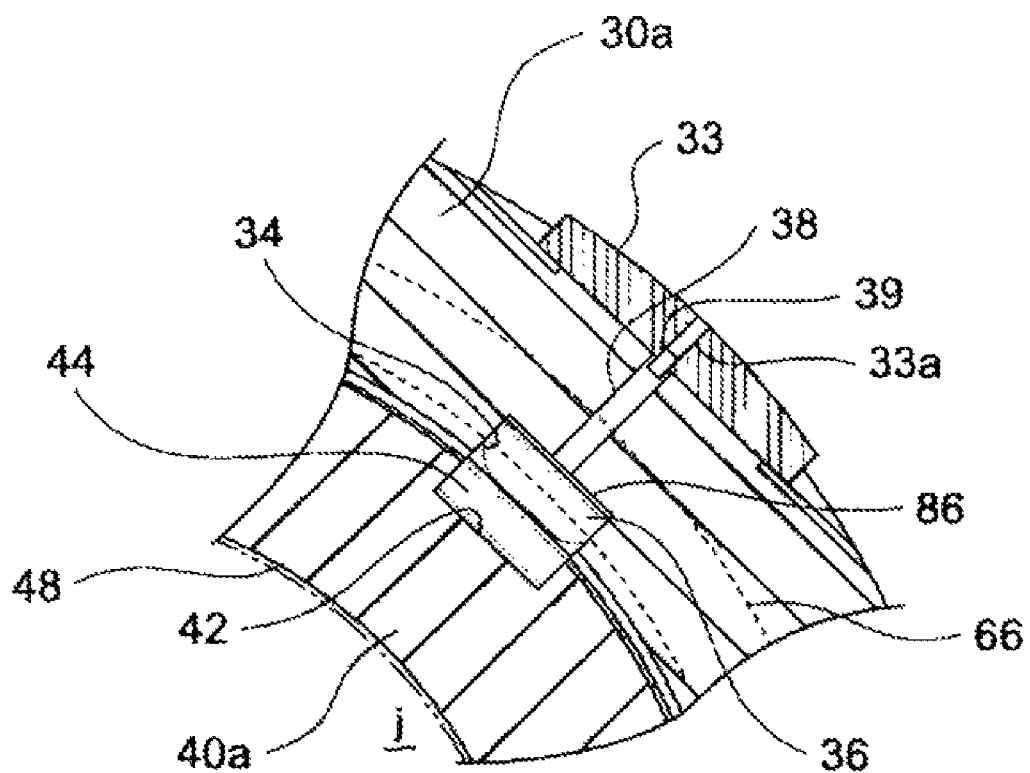
FIG. 4 is a partial enlarged sectional view near the spherical pivot 36 in FIG. 1.

Four tilting pads 40a~d are disposed inside the bearing housing to surround coaxially the rotation shaft. Hereunder, suffixes a~d will be omitted when matter common to all of the tilting pads is recited. This is similarly applied to other constituent parts. As shown in FIG. 4, a recess 42 is provided in the back face (outer face) of each of the tilting pads 40 near the center part thereof, and an adjusting liner 44 is press fit in the recess. A recess 34 is formed in the inner face of the bearing housing 30 at a position facing the adjusting liner 44, and a spherical pivot 36 is inserted in the recess.

The surface of the spherical pivot 36 facing the adjusting liner 44 is formed into a spherical surface so that the tilting pad 40 is circumferentially and axially swingable in relation to the journal j. The tilting pads 40 are located such that a circumferential spacing s1 is provided between each of the pads. The spherical pivots 36 are located such that their centers are at positions 45° from the vertical center line or horizontal center line of the journal bearing.

The spherical pivot 36 is received in the recess 34 such that the top of its spherical surface is level with the inner circumferential surface of the bearing housing 30. Therefore, the tilting pad 40 can be removed from the bearing assembly with the adjusting liner 44 fixed in the recess 42 thereof by removing a side plate mentioned later and sliding the tilting pad in the axial direction of the journal.

Radial holes for measurement 38 are drilled in the upper bearing housing 30a penetrating the upper bearing housing 30a from the outer periphery thereof to the recesses 34. An outer liner 33 is provided on the outer periphery of the bearing housing 30 at a circumferential position thereof radially opposite behind the bearing housing 30 to the spherical pivot 36 located in the recess 34 in the inside face of the bearing housing 30.

As shown in FIG. 4, the outer liner 33 is attached to the outer periphery of the bearing housing 30 by means of fastening bolts not shown in the drawings. The outer periphery of the outer liner 33 protrudes a little from the circumferential surface of the bearing housing 30.

Therefore, the outer liner 33 contacts the concave surface 20a of the bearing platform 20, and the lower bearing housing 30b is supported by the bearing platform 20 via the medium of the outer liner 33. There is a radial clearance s2 between the concave surface 20a of the bearing platform 20 and the outer surface of the lower bearing housing 30b.

A hole 33a is drilled in the outer liner 33 to communicate with the hole for measurement 38. The hole for measurement 38 is plugged by a plug 39 after measurement mentioned later is finished.

As shown in FIG. 2, annular side plates 35 are attached to both side ends of the bearing housing 30 to retain the tilting pads between the inner circumferential surface of the bearing housing and the rotating surface of the journal j. The annular side plates 35 are fixed to both sides of the bearing housing 30 by means of a plurality of fastening bolts 37. There is a radial clearance s3 between the inner periphery of the annular side plate and the rotating surface of the journal j. Lubrication oil injected from oil supply nozzles 50 is drained through the radial clearance s3 after the lubrication oil served to lubricate between the journal j and pads 40.

Figure 5:
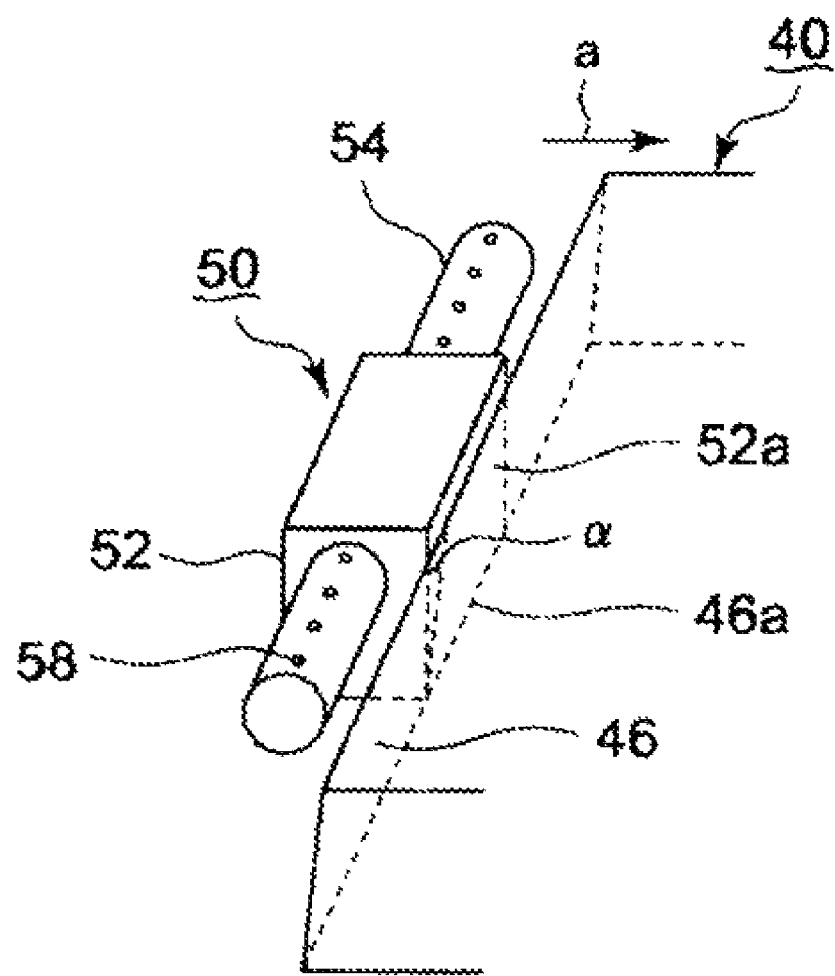
FIG. 5 is a perspective view of the oil supply nozzle 50 of the embodiment of FIG. 1.

As shown in FIG. 1, the oil supply nozzles 50 for injecting lubrication oil are attached to the bearing housing 30 to be located at both end sides of each of the tilting pads 40, that is, located at the upstream side and down stream side in relation to the rotation direction of the journal j. FIG. 5 shows an example of the oil supply nozzle 50 in a perspective view.

Structure of the oil supply nozzle 50 will be explained referring to FIG. 2 and FIG. 5. The oil supply nozzles located in the upstream side are same in construction as those located in the downstream side.

The oil supply nozzle 50 consists of a main casing 52 and nozzle arms 54. The main casing 52 has a rectangular parallel-piped part and cylindrical part. The nozzle arms 54 extend from both side faces opposite to each other of the rectangular parallel-piped part. The cylindrical part is inserted into a radial hole 70 drilled at an axial center part of the bearing housing 30 so that the rectangular parallel-piped part is located adjacent to the circumferential side end of the tilting pad 40 and the nozzle arms 54 extend in the axial direction of the journal j. The main casing 52 and arms 54 have a hollow 56 into which lubrication oil is introduced.

Each of the nozzle arms 54 has a plurality of nozzle holes 58 at equal spacing along the arm so that the nozzle holes 58 face toward the journal j along the axial direction thereof when the oil supply nozzle 50 is attached to the bearing housing 30. Lubrication oil injected from the nozzle holes 58 of the oil supply nozzle 50 located in the upstream side of the tilting pad 40 in relation to rotation direction of the journal j intrudes into the radial clearance between the inner circumferential surface of the tilting pad 40 (bearing surface 48 in FIG. 4) and the rotating surface of the journal j dragged by the rotation of the journal j to form oil film there.

Lubrication oil injected from the nozzle holes 58 of the oil supply nozzle 50 located in the downstream side of the tilting pad 40 in relation to rotation direction of the journal j cools the lubrication oil passed through the clearance between the bearing surface of the tilting pad and rotating surface of the journal j (oil clearance between the journal and tilting pad) and concurrently disrupts the oil film adhered on the rotating surface of the journal j to make the oil film to be separated therefrom. By this, intrusion of lubrication oil dragged by the rotation surface of the journal from the oil clearance between the journal and upstream tilting pad into the oil clearance between the journal and downstream tilting pad next to said upstream tilting pad is prevented. Lubrication oil flowed out from the downstream end of the tilting pad is drained through the radial clearance s3 between the side plate 35 and journal j.

As shown in FIG. 5, the main casing 52 is attached to the bearing housing such that a face 52a of the rectangular parallelpiped part thereof facing the tilted surface 46 of the tilting pad 40 contacts a base part 46a of the tilted surface 46 of the tilting pad 40, and tilted surface 46 skews by a small angle α so that the clearance between the tilted surface 46 and the face 52a increases radially inwardly. In this way, the base part 46a of the tilted surface 46 of the tilting pad 40 is supported at the face 52a of the main casing 52 in a form of line-contact, thereby the oil supply nozzle 50 supports immovably the movement of the tilting pad in the direction of the journal rotation.

Figure 6:
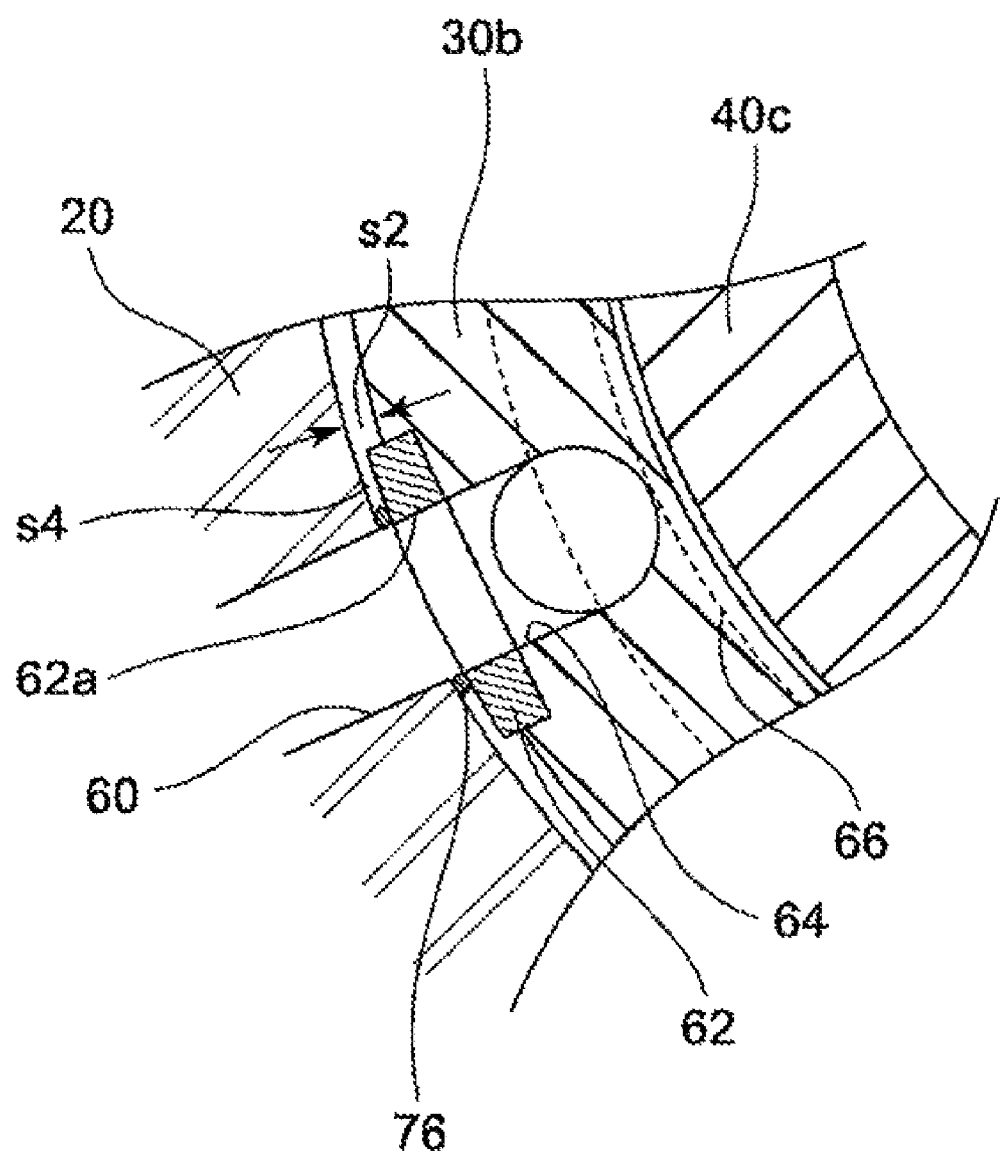
FIG. 6 is a partial enlarged sectional view near the oil supply hole 60 in FIG. 1.

As shown in FIG. 1, an oil supply hole 60 is provided in the bearing platform 20. An outer liner 62 is located on the outer periphery of the lower bearing housing 30b at a position facing the oil supply hole 60. Configuration of this portion will be explained referring to FIG. 6. In FIG. 6, the outer liner 62 has an oil supply hole 62a communicating to the oil supply hole 60.

An oil supply hole 64 is drilled radially in the lower bearing housing 30b such that the oil supply hole 64 communicates to the oil supply hole 60 by way of the oil supply hole 62a of the outer liner 62. Annular oil groove 66 is provided in an axial side face of the bearing housing 30.

The annular oil groove 66 runs all around the axial side end of the bearing housing 30. As shown in FIG. 2, the annular oil groove 66 is communicated to a hollow 56 of the main casing 52 of the oil supply nozzle 50 by an axial oil hole 68 in the bearing housing 30. An open end of the hollow 56 at the end of the cylindrical part of the main casing 52 is closed by a plug 72 and the plug 72 is secured by a C-shaped retaining ring 74.

A radial clearance s4 is formed between the inner circumferential surface of the bearing platform 20 and outer periphery of the outer liner 62 (see FIG. 6). An o-ring 76 is placed in the clearance s4 to seal the clearance. By this, oil leakage through the clearance s4 is prevented and concurrently the o-ring 76 serves so that a bearing load exerted on the bearing platform 20 from the lower bearing housing 30b by the intermediary of the outer liner 62 becomes smaller than a bearing load exerted on the bearing platform 20 from the lower bearing housing 30b by the intermediary of the outer liner 33.

Figure 7:
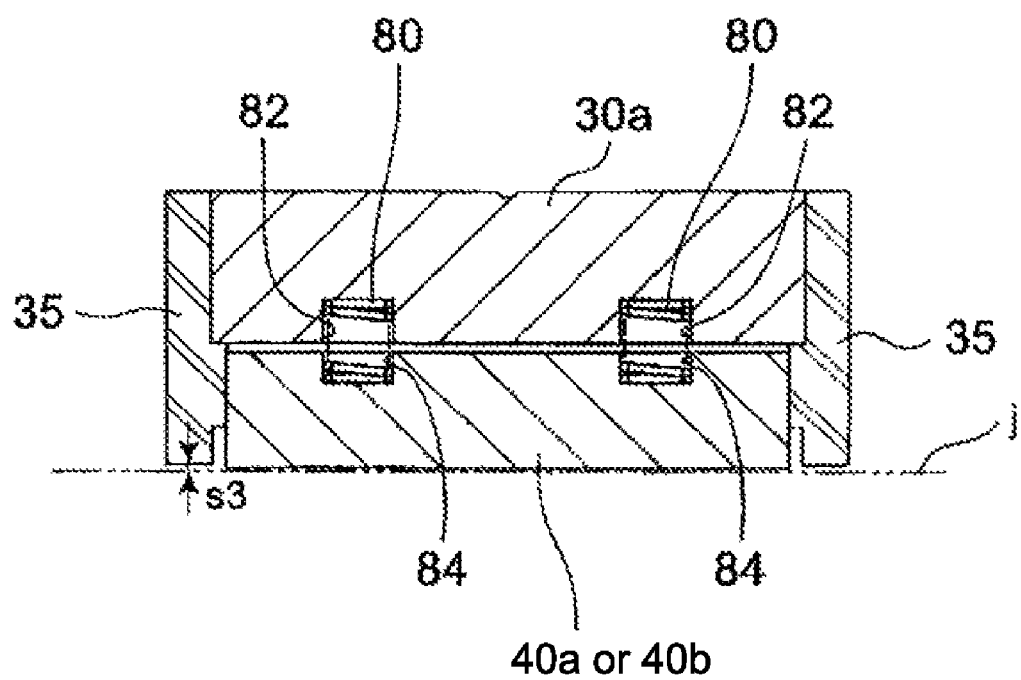
FIG. 7 is a sectional view along line D-D in FIG. 1.
Figure 8:
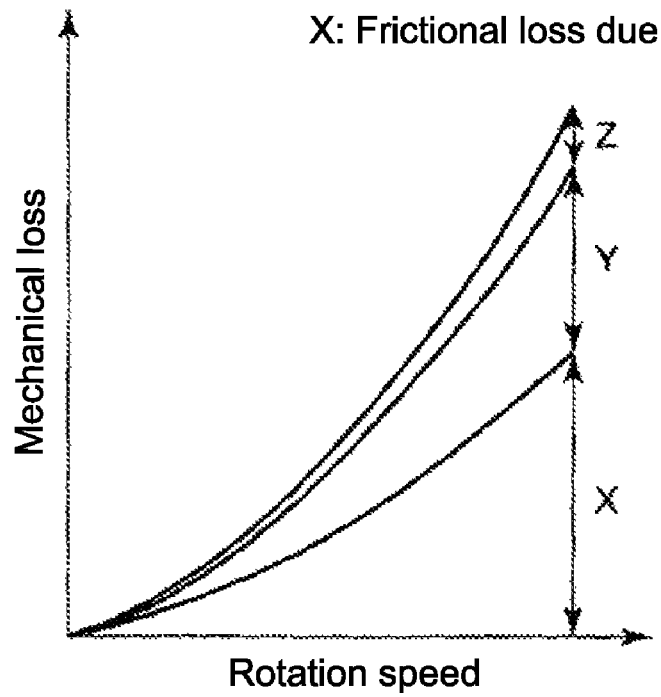
FIG. 8 is a graph showing mechanical loss in a tilting pad journal bearing of oil flooded type.
Figure 9:
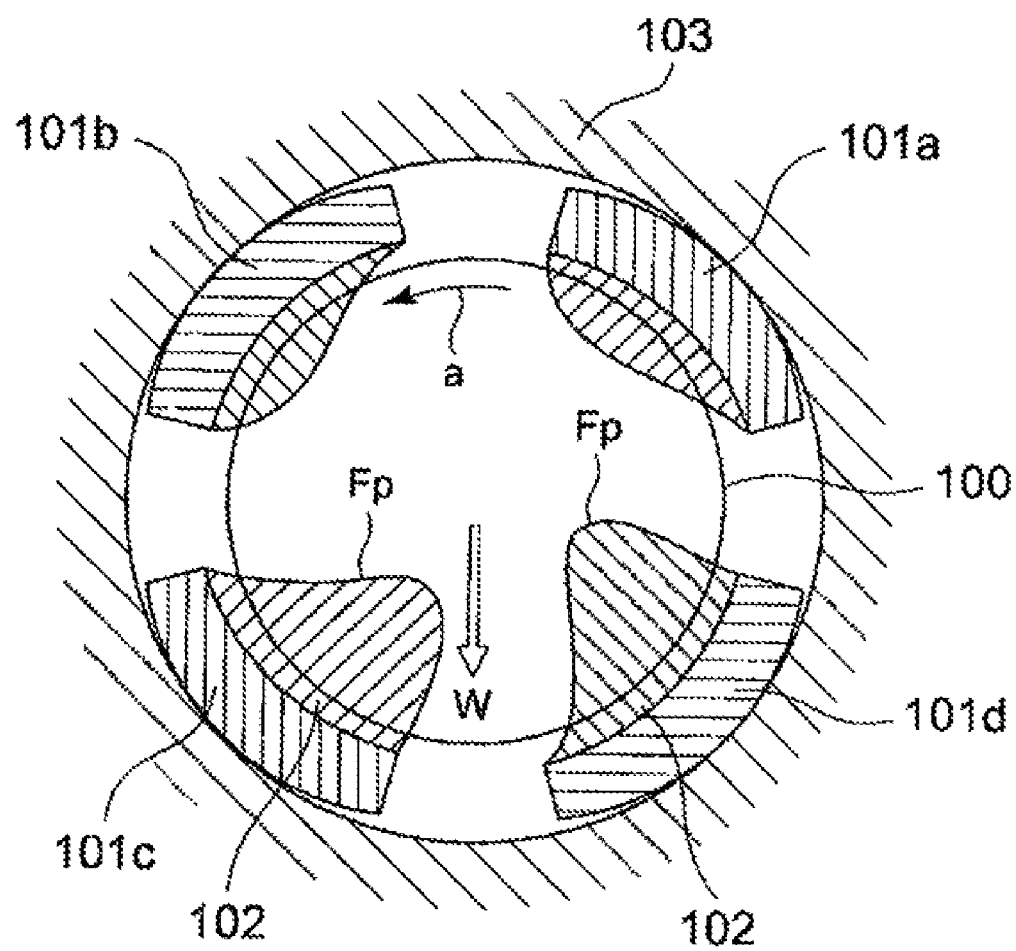
FIG. 9 is a drawing for explaining of formation of oil film pressure in the journal bearing due to the wedge effect.

As shown in FIG. 7, two circular recesses 84 are provided in each of the outer circumferential surface of the tilting pads 40a and 40b at a certain spacing in the axial direction thereof and two circular recesses 82 are provided in the circumferential surface of the upper housing 30a. Each of the circular recesses 84 faces the circular recess 82 so that a cylindrical hollow is formed. The recesses 84 are provided near the downstream end of the tilting pads 40a and 40b in relation to the rotation direction of the journal j as can be seen in FIG. 1. In the cylindrical hollow formed by the two recesses facing each other is installed with a coil spring 80, which pushes the tilting pad radially toward the journal j near the downstream side end thereof. Therefore, as shown in FIG. 9, it becomes easy that an oil clearance narrowing in the rotation direction of the journal j is formed between rotating surface of the journal and bearing surface of tilting pad 40a and 40b.

As shown in FIG. 1, radial screw holes 90 are provided near the upstream end part and downstream end part of each of the tilting pads 40 in relation to the rotation direction of the journal j. Radial through holes 92 are drilled in the bearing housing 30 where the radial though hole 92 faces the opening of the corresponding radial screw hole 90 so that the radial through hole 92 and the radial screw hole 90 has a same axis line. A hexagon socket head screw 94 is inserted through each of the radial through holes 92 and its fore-end part is screwed into each of the screw holes 90.

The radial clearance between the inner surface of the bearing housing 30 and the outer surface of the tilting pad 40 can be adjusted by adjusting screwed-in length of the hexagon socket head screw 94, thereby the radial clearance (bearing clearance) between the rotating surface of the journal and bearing surface of the tilting pad 40 can be adjusted.

In this manner, the upstream side radial clearance and downstream side radial clearance between the journal surface and bearing surface of the tilting pad can be adjusted separately, that is, the attitude of the tilting pad can be adjusted, to obtain a wedge-shaped radial clearance by a compact and inexpensive means.

In such an embodiment of the invention, lubrication oil is supplied from the oil supply hole 60 provided in the bearing platform 20 to the hollows 56 of the oil supply nozzles 50 through the annular oil groove 66 and axial oil hole 68 in the bearing housing 30. The lubrication oil is injected from the nozzle holes 58 of the nozzle arms 54 of the oil supply nozzle 50 toward the rotating surface of the journal j.

Lubrication oil injected from the oil supply nozzle 50 located at the upstream side of the tilting pad 40 in relation to the rotation direction of the journal j is introduced into the oil clearance between the journal and tilting pad to lubricate the rotating surface of the journal j and bearing surface 48. Lubrication oil injected from the oil supply nozzle 50 located at the downstream side of the tilting pad 40 in relation to the rotation direction of the journal j impinges against the rotating surface of the journal j, cools the lubrication oil risen in temperature in the oil clearance between the journal surface and bearing surface of the upstream tilting pad adhering on the rotating surface of the journal j, and disturbs the oil layer adhering on the rotating surface of the journal to prevent the high temperature oil layer adhered on the rotating surface of the journal from being carried into the oil clearance between the journal surface and bearing surface of the adjacent downstream tilting pad. By this, excessive temperature rise of the bearing surface 48 of the tilting pad 40 can be prevented and occurrence of bearing seizure is prevented.

Radial clearance between the journal surface and bearing surface 48 of the tilting pad can be adjusted to a desired clearance by measuring the distance from the rear face of the spherical pivot 36 to the open end of the radial hole for measurement 38 by means of a known measuring device and determine the radial clearance between the journal surface and bearing surface 48, and inserting an adjusting shim 86 in the recess 34 on the back face of the spherical pivot 36 based on the measurement.

By using this clearance adjusting means together with the clearance adjusting by the hexagon socket head screws 94, clearance between the journal surface and bearing surface of the tilting pad can be adjusted to a desired clearance with high accuracy such that the clearance becomes narrow toward the downstream side of the tilting pad in relation to the rotation direction of the journal as shown in FIG. 9. Therefore, high oil film pressure owing to the wedge effect can be generated easier on the bearing surface 48 and high performance of lubrication of the bearing surface 48 can be maintained.

Self weight of the rotation shaft exerts on the tilting pads 40c and 40d located on the lower bearing housing 30b, so a wedge-shaped radial clearance narrowing downstream as shown in FIG. 9 can be formed relatively easily. On the other hand, the self weight of the rotation shaft does not exerts on the tilting pads 40a and 40b located on the upper housing 30a, so the formation of high pressure oil film between the journal surface and bearing surfaces 48 of the upper tilting pads 40a and 40b is not as easy.

According to the embodiment, the downstream end part of each of the tilting pads 40a and 40b located on the upper bearing housing are pushed radially inward by the elastic force of the coil springs 80, so wedge-shaped radial clearance narrowing downstream can be easily formed also in the upper tilting pads 40a and 40b. Therefore, high pressure oil film can be generated on the bearing surface of the upper tilting pads 40a and 40b by the wedge effect.

As the self weight of the rotation shaft does not exert on the upper tilting pads 40a and 40b, there has been a tendency that vibration of the upper tilting pad occurs, which will cause occurrence of fatigue failure of the bearing surface of the tilting pad. This problem can be eliminated according to the embodiment.

Further, as the oil supply nozzles 50 are located at the upstream and downstream side of the tilting pad such that the tilting pad is stopped its movement in the circumferential direction by the main casing 52 of the oil supply nozzle 50, separate means for preventing movement of the tilting pad in the circumferential direction dragged by the rotation of the journal is not needed, and the journal bearing can be simplified in structure.

Further, as the tilting pad 40 is supported at the outer side periphery part 46a, the space in front and rear side of the tilting pad can be broaden, which enables to realize further stable supply of the lubricating oil.

Conventionally, the spherical pivot 36 is received in the recess of the bearing housing 30 such that it extends into the recess of the tilting pad 40 so that the spherical pivot 36 serves to prevent circumferential movement of the tilting pad 40. Such configuration is not needed according to the embodiment of the present invention. Therefore, by allowing the spherical surface of the spherical pivot to be leveled with the inner circumferential surface of the bearing housing 30, the tilting pad 40 can be drawn out axially along the journal j by only removing the side plate 35. Therefore, the tilting pad 40 can be removed with the journal in the place as it is, which facilitates removing and attaching of the tilting pad 40 when repairing or changing the same.

Furthermore, according to the embodiment, by providing the outer liner 62 having the oil supply hole 62a which communicates with the oil supply hole 60 in the bearing platform 20 separately in addition to the outer liners 33, reduction of rigidity of the outer liner 33 if an oil hole is drilled to it as is in a conventional example of tilting pad journal bearing can be prevented. Therefore, necessity of increasing radial thickness of the bearing housing 30 to compensate for the reduction in rigidity of the outer liner 33 can be eliminated.

Further, as the outer liner 62 is provided such that the load that the outer liner 62 receives from the bearing housing 30 is smaller than the load received by the outer liner 33, the oil supply hole 62a can be provided without increasing the number of supporting point of the bearing housing 30. Therefore, there is no need to raise the dimensional accuracy of the load supporting part of the bearing housing 30, and easiness of assembling the journal bearing can be retained.

Further, as the outer liner 62 is provided to the lower bearing housing 30b on which the bearing load exerts from the journal j through the intermediary of the tilting pad 40, adjustment of bearing load becomes easy, and in addition, as the o-ring 76 capable of elastic deformation is placed between the outer liner 62 and bearing platform 20, adjustment of bearing load is further facilitated.

Further, lubrication oil is supplied to the nozzle arms 54 of the oil supply nozzles 50 through the oil supply hole 60 in the bearing platform 20, annular oil groove 66, oil supply hole 68, and the hollow 56 in the main casing of the oil supply nozzle 50 with simple construction without decreasing the rigidity of the bearing housing 30.

The O-ring is used between the outer liner 62 and bearing platform 20 in the embodiment, however, other elastic member, for example, a bellow and so on may be used instead of the O-ring. By using an elastic member between the outer liner 62 and bearing platform like this, adjustment of the bearing load exerting on the bearing platform 20 from the bearing housing 30 through the outer liner 62 becomes easy.

INDUSTRIAL APPLICABILITY

According to the invention, a rotation shaft supporting structure adopting a direct lubrication type tilting pad journal bearing can be provided, with which a high pressure oil film can be formed on the bearing surface of an upper tilting pad by a simple and inexpensive means, occurrence of carryover of lubrication oil is eliminated, and simplification in construction, reduction in manufacturing cost, and ease in assembling/disassembling of the journal bearing are achieved, and which can be preferably applied to large rotating machines such as steam turbines, gas turbines and electric generators.

The invention claimed is:

1. A rotation shaft supporting structure of a journal bearing, the rotation shaft supporting structure comprising:
    a cylindrical bearing housing;
    a plurality of pads that are capable of self-alignment and are circumferentially spaced along an inner surface of the cylindrical bearing housing, the plurality of pads configured to support a journal, each of the plurality of pads having a bearing surface that forms a radial clearance with a rotating surface of the journal for lubrication oil;
    radial clearance forming means provided between an inner face of an upper portion of the cylindrical bearing housing and a back face of an upper pad of the plurality of pads and at a downstream position of the upper pad in relation to a direction of rotation of the journal, the radial clearance forming means allowing the radial clearance between the bearing surface of the upper pad and the rotating surface of the journal to narrow from upstream to downstream in the direction of rotation of the journal; and
    pad attitude adjusting means provided at both an upstream end part and a downstream end part of the upper pad in relation to the direction of rotation of the journal, the pad attitude adjusting means allowing for adjustment of the radial clearance between the bearing surface of the upper pad and the rotating surface of the journal,
    wherein the upper pad is free of a weight of the journal.

2. A rotation shaft supporting structure of a journal bearing according to claim 1,
    wherein each of the pad attitude adjusting means is a bolt which penetrates a through hole drilled through the cylindrical bearing housing at such a position that the bolt is screwed into a screw hole provided in the back face of the upper pad, whereby the radial clearance between the bearing surface of the upper pad and the rotating surface of the journal is adjustable by adjusting a screwed-in length of the bolt into the screw hole in the back face of the upper pad.

3. A rotation shaft supporting structure of a journal bearing according to claim 2, further comprising
    a plurality of spherical pivots attached to the inner surface of the cylindrical bearing housing, each of the plurality of spherical pivots supporting one of the plurality of pads at its central zone so that the plurality of pads are swingable circumferentially and axially in relation to the journal,
    wherein a radial through hole is drilled in the upper portion of the cylindrical bearing housing from an outer periphery of the cylindrical bearing housing radially inwardly at such a position that the radial through hole opens facing a back face of a spherical pivot supporting the upper pad of the plurality of spherical pivots so that a depth from the outer periphery of the cylindrical bearing housing to the back face of the spherical pivot can be measured, whereby the radial clearance between the bearing surface of the upper pad and the rotating surface of the journal is adjusted based on a measurement result of the depth.

4. A rotation shaft supporting structure of a journal bearing according to claim 1, further comprising a plurality of spherical pivots attached to the inner surface of the cylindrical bearing housing, each of the plurality of spherical pivots supporting one of the plurality of pads at its central zone so that the plurality of pads are swingable circumferentially and axially in relation to the journal, wherein a radial through hole is drilled in the upper portion of the cylindrical bearing housing from an outer periphery of the cylindrical bearing housing radially inwardly at such a position that the radial through hole opens facing a back face of a spherical pivot supporting the upper pad of the plurality of spherical pivots so that a depth from the outer periphery of the cylindrical bearing housing to the back face of the spherical pivot can be measured, whereby the radial clearance between the bearing surface of the upper pad and the rotating surface of the journal is adjusted based on a measurement result of the depth.

5. A rotation shaft supporting structure of a journal bearing according to claim 4, further comprising:

a plurality of first oil supply nozzles, each of the plurality of first oil supply nozzles located upstream of a respective one of the plurality of pads in the direction of rotation of the journal for supplying the lubrication oil to the bearing surface of the respective one of the plurality of pads; and a plurality of second oil supply nozzles that are separate from the plurality of first oil supply nozzles, each of the plurality of second supply nozzles located downstream of a respective one of the plurality of pads in the direction of rotation of the journal for preventing carryover of the lubrication oil flowed out from a downstream side end of the respective one of the plurality of pads to the bearing surface of another pad of the plurality of pads that is adjacent to the respective one of the plurality of pads and downstream of the respective one of the plurality of pads in the direction of rotation of the journal, whereby one of the plurality of first oil supply nozzles and one of the plurality of second oil supply nozzles are located between each adjacent pair of the plurality of pads, wherein each of the plurality of first oil supply nozzles has a casing part and is attached to the cylindrical bearing housing such that a side face of the casing part contacts an upstream side end face of the respective one of the plurality of pads at least in line contact with an outer side periphery of the respective one of the plurality of pads, and each of the plurality of second oil supply nozzles has a casing part and is attached to the cylindrical bearing housing such that a side face of the casing part contacts a downstream side end face of the respective one of the plurality of pads at least in line contact with the outer side periphery of the respective one of the plurality of pads, thereby each pair of the first and second oil supply nozzles serves as stoppers to prevent circumferential movement of the respective one of the plurality of pads.

6. A rotation shaft supporting structure of a journal bearing according to claim 5, wherein the upstream and downstream side end faces of the plurality of pads are formed such that the side faces of the casing parts of the plurality of first and second oil supply nozzles attached to the bearing housing contact the outer side peripheries of the plurality of pads in line contact and the upstream and downstream side end faces of the plurality of pads depart from the side faces of the casing parts of the plurality of first and second oil supply nozzles as the upstream and downstream side end faces of the plurality of pads run radially inwardly.

7. A rotation shaft supporting structure of a journal bearing according to claim 6, further comprising a plurality of spherical pivots attached to the inner surface of the cylindrical bearing housing, each of the plurality of spherical pivots supporting one of the plurality of pads at its central zone so that the plurality of pads are swingable circumferentially and axially in relation to the journal, wherein the plurality of spherical pivots are received in recesses provided in the inner surface of the cylindrical bearing housing such that a radially inward-most portion of a spherical surface of each of the plurality of pivots is level with the inner surface of the cylindrical bearing housing, thereby enabling the plurality of pads to be inserted and extracted in an axial direction of the journal.

8. A rotation shaft supporting structure of a journal bearing according to claim 1, wherein the radial clearance forming means is a spring member provided between the inner face of the upper portion of the cylindrical bearing housing and the back face of the upper pad to push the upper pad radially inwardly at the downstream position of the upper pad, thereby allowing the radial clearance between the bearing surface of the upper pad and the rotating surface of the journal to narrow from upstream to downstream in the direction of rotation of the journal.

9. A rotation shaft supporting structure of a journal bearing, the rotation shaft supporting structure comprising:

a cylindrical bearing housing;

a plurality of pads that are capable of self-alignment and are circumferentially spaced along an inner surface of the cylindrical bearing housing, the plurality of pads configured to support a journal, each of the plurality of pads having a bearing surface that forms a radial clearance with a rotating surface of the journal for lubrication oil;

radial clearance forming means provided between an inner face of an upper portion of the cylindrical bearing housing and a back face of an upper pad of the plurality of pads and at a downstream position of the upper pad in relation to a direction of rotation of the journal, the radial clearance forming means allowing the radial clearance between the bearing surface of the upper pad and the rotating surface of the journal to narrow from upstream to downstream in the direction of rotation of the journal; and a plurality of spherical pivots attached to the inner surface of the cylindrical bearing housing, each of the plurality of spherical pivots supporting one of the plurality of pads at its central zone so that the plurality of pads are swingable circumferentially and axially in relation to the journal, wherein the upper pad is free of a weight of the journal, and wherein a radial through hole is drilled in the upper portion of the cylindrical bearing housing from an outer periphery of the cylindrical bearing housing radially inwardly at such a position that the radial through hole opens facing a back face of a spherical pivot supporting the upper pad of the plurality of spherical pivots so that a depth from the outer periphery of the cylindrical bearing housing to the back face of the spherical pivot can be measured, whereby the radial clearance between the bearing surface of the upper pad and the rotating surface of the journal is adjusted based on a measurement result of the depth.

10. A rotation shaft supporting structure of a journal bearing according to claim 2, claim 9,
wherein
the radial clearance forming means is a spring member provided between the inner face of the upper portion of the cylindrical bearing housing and the back face of the upper pad to push the upper pad radially inwardly at the downstream position of the upper pad, thereby allowing the radial clearance between the bearing surface of the upper pad and the rotating surface of the journal to narrow from upstream to downstream in the direction of rotation of the journal.

11. A rotation shaft supporting structure of a journal bearing according to claim 9,
wherein the spherical pivot supporting the upper pad is accommodated in a recess provided in the inner surface of the cylindrical bearing housing, and the radial through hole penetrates from the outer periphery of the cylindrical bearing housing to the recess.

12. A rotation shaft supporting structure of a journal bearing, the rotation shaft supporting structure comprising:
a cylindrical bearing housing;
a plurality of pads that are capable of self-alignment and are circumferentially spaced along an inner surface of the cylindrical bearing housing, the plurality of pads configured to support a journal, each of the plurality of pads having a bearing surface that forms a radial clearance with a rotating surface of the journal for lubrication oil;
radial clearance forming means provided between an inner face of an upper portion of the cylindrical bearing housing and a back face of an upper pad of the plurality of pads and at a downstream position of the upper pad in relation to a direction of rotation of the journal, the radial clearance forming means allowing the radial clearance between the bearing surface of the upper pad and the rotating surface of the journal to narrow from upstream to downstream in the direction of rotation of the journal;
a plurality of first oil supply nozzles, each of the plurality of first oil supply nozzles located upstream of a respective one of the plurality of pads in the direction of rotation of the journal for supplying the lubrication oil to the bearing surface of the respective one of the plurality of pads; and
a plurality of second oil supply nozzles that are separate from the plurality of first oil supply nozzles, each of the plurality of second supply nozzles located downstream of a respective one of the plurality of pads in the direction of rotation of the journal for preventing carryover of the lubrication oil flowed out from a downstream side end of the respective one of the plurality of pads to the bearing surface of another pad of the plurality of pads that is adjacent to the respective one of the plurality of ads and downstream of the respective one of the plurality of pads in the direction of rotation of the journal, whereby one of the plurality of first oil supply nozzles and one of the plurality of second oil supply nozzles are located between each adjacent pair of the plurality of pads,
wherein the upper pad is free of a weight of the journal, and
wherein each of the plurality of first oil supply nozzles has a casing part and is attached to the cylindrical bearing housing such that a side face of the casing part contacts an upstream side end face of the respective one of the plurality of pads at least in line contact with an outer side periphery of the respective one of the plurality of pads, and each of the plurality of second oil supply nozzles has a casing part and is attached to the cylindrical bearing housing such that a side face of the casing part contacts a downstream side end face of the respective one of the plurality of pads at least in line contact with the outer side periphery of the respective one of the plurality of pads, thereby each pair of the first and second oil supply nozzles serves as stoppers to prevent circumferential movement of the respective one of the plurality of pads.

13. A rotation shaft supporting structure of a journal bearing according to claim 12,
wherein the upstream and downstream side end faces of the plurality of pads are formed such that the side faces of the casing parts of the plurality of first and second oil supply nozzles attached to the bearing housing contact the outer side peripheries of the plurality of pads in line contact and the upstream and downstream side end faces of the plurality of pads depart from the side faces of the casing parts of the plurality of first and second oil supply nozzles as the upstream and downstream side end faces of the plurality of pads run radially inwardly.

14. A rotation shaft supporting structure of a journal bearing according to claim 13, further comprising
a plurality of spherical pivots attached to the inner surface of the cylindrical bearing housing, each of the plurality of spherical pivots supporting one of the plurality of pads at its central zone so that the plurality of pads are swingable circumferentially and axially in relation to the journal,
wherein the plurality of spherical pivots are received in recesses provided in the inner surface of the cylindrical bearing housing such that a radially inward-most portion of a spherical surface of each of the plurality of pivots is level with the inner surface of the cylindrical bearing housing, thereby enabling the plurality of pads to be inserted and extracted in an axial direction of the journal.

15. A rotation shaft supporting structure of a journal bearing according to claim 12, further comprising
a plurality of spherical pivots received in recesses provided in the inner surface of the cylindrical bearing housing, each of the plurality of spherical pivots supporting one of the plurality of pads at its central zone so that the plurality of pads are swingable circumferentially and axially in relation to the journal,
wherein a radial through hole is drilled in the upper portion of the cylindrical bearing housing from an outer periphery of the cylindrical bearing housing radially inwardly at such a position that the radial through hole opens facing a back face of a spherical pivot supporting the upper pad of the plurality of spherical pivots so that a depth from the outer periphery of the cylindrical bearing housing to the back face of the spherical pivot can be measured, whereby the radial clearance between the bearing surface of the upper pad and the rotating surface of the journal is adjusted based on a measurement result of the depth.

16. A rotation shaft supporting structure of a journal bearing according to claim 12, further comprising
a plurality of spherical pivots attached to the inner surface of the cylindrical bearing housing, each of the plurality of spherical pivots supporting one of the plurality of pads at its central zone so that the plurality of pads are swingable circumferentially and axially in relation to the journal,
wherein the plurality of spherical pivots are received in recesses provided in the inner surface of the cylindrical bearing housing such that a radially inward-most portion of a spherical surface of each of the plurality of pivots is level with the inner surface of the cylindrical bearing housing, thereby enabling the plurality of pads to be inserted and extracted in an axial direction of the journal.

17. A rotation shaft supporting structure of a journal bearing according to claim 12,
wherein the radial clearance forming means is a spring member provided between the inner face of the upper portion of the cylindrical bearing housing and the back face of the upper pad to push the upper pad radially inwardly at the downstream position of the upper pad, thereby allowing the radial clearance between the bearing surface of the upper pad and the rotating surface of the journal to narrow from upstream to downstream in the direction of rotation of the journal.

18. A method of assembling a journal bearing having a rotation shaft supporting structure including:
a cylindrical bearing housing;
a plurality of pads that are capable of self-alignment and are circumferentially spaced along an inner surface of the cylindrical bearing housing, the plurality of pads configured to support a journal, each of the plurality of pads having a bearing surface that forms a radial clearance with a rotating surface of the journal for lubrication oil;
radial clearance forming means provided between an inner face of an upper portion of the cylindrical bearing housing and a back face of an upper pad of the plurality of pads and at a downstream position of the upper pad in relation to a direction of rotation of the journal, the radial clearance forming means allowing the radial clearance between the bearing surface of the upper pad and the rotating surface of the journal to narrow from upstream to downstream in the direction of rotation of the journal;
a plurality of spherical pivots received in recesses provided in the inner surface of the cylindrical bearing housing, each of the plurality of spherical pivots supporting one of the plurality of pads at its central zone so that the plurality of pads are swingable circumferentially and axially in relation to the journal;
a first oil supply nozzle located upstream of the upper pad in the direction of rotation of the journal for supplying the lubrication oil to the bearing surface of the upper pad; and
a second oil supply nozzle located downstream of the upper pad in the direction of rotation of the journal for preventing carryover of the lubrication oil flowed out from a downstream side end of the upper pad to the bearing surface of another pad of the plurality of pads that is adjacent to the upper pad and downstream of the upper pad in the direction of rotation of the journal,
wherein the upper pad is free of a weight of the journal,
wherein the first oil supply nozzle has a casing part and is attached to the cylindrical bearing housing such that a side face of the casing part contacts an upstream side end face of the upper pad at least in line contact with an outer side periphery of the upper pad, and the second oil supply nozzle has a casing part and is attached to the cylindrical bearing housing such that a side face of the casing part contacts a downstream side end face of the upper pad at least in line contact with the outer side periphery of the upper pad, thereby the first and second oil supply nozzles serve as stoppers to prevent circumferential movement of the upper pad, and
wherein a radial through hole is drilled in the upper portion of the cylindrical bearing housing from an outer periphery of the cylindrical bearing housing radially inwardly at such a position that the radial through hole opens facing a back face of a spherical pivot supporting the upper pad of the plurality of spherical pivots so that a depth from the outer periphery of the cylindrical bearing housing to the back face of the spherical pivot can be measured, whereby the radial clearance between the bearing surface of the upper pad and the rotating surface of the journal is adjusted based on a measurement result of the depth,
the method comprising:
measuring the depth from the outer periphery of the cylindrical bearing housing to the back face of the spherical pivot; and
placing an adjusting shim on the back face of the spherical pivot to adjust a position of a radially inward-most portion of a spherical surface of the spherical pivot in order to adjust the radial clearance between the bearing surface of the upper pad and the rotating surface of the journal.

19. A method of assembling a journal bearing according to claim 18,
wherein the rotation shaft supporting structure further includes pad attitude adjusting means provided at both an upstream end part and a downstream end part of the upper pad in relation to the direction of rotation of the journal, the pad attitude adjusting means allowing for adjustment of the radial clearance between the bearing surface of the upper pad and the rotating surface of the journal so that the radial clearance narrows from upstream to downstream in the direction of rotation of the journal, thereby effecting generation of a lubrication oil film that increases in pressure from upstream to downstream in the direction of rotation of the journal.

20. A method of assembling a journal bearing according to claim 19,
wherein each of the pad attitude adjusting means is a bolt which penetrates a through hole drilled through the cylindrical bearing housing at such a position that the bolt is screwed into a screw hole provided in the back face of the upper pad, whereby the radial clearance between the bearing surface of the upper pad and the rotating surface of the journal is adjustable by adjusting screwed-in length of the bolt into the screw hole in the back face of the upper pad.

* * * * *